United States Patent [19]

Grant

[11] Patent Number: 4,577,905
[45] Date of Patent: Mar. 25, 1986

[54] VEHICLE ARMREST

[76] Inventor: Robert J. Grant, 7846 Normile, Dearborn, Mich. 48126

[21] Appl. No.: 511,463

[22] Filed: Jul. 7, 1983

[51] Int. Cl.[4] .............................................. A47C 7/54
[52] U.S. Cl. .................................... 297/411; 297/417
[58] Field of Search ................ 297/411, 417; 296/153, 296/37.14, 37.8, 37.1

[56] References Cited

U.S. PATENT DOCUMENTS

| | | | |
|---|---|---|---|
| 1,145,346 | 7/1915 | Wallace | 297/417 |
| 2,409,316 | 10/1946 | Rogers | 297/417 |
| 3,428,357 | 2/1969 | Lueck | 297/411 |
| 3,779,600 | 12/1973 | Quakenbush | 297/417 |
| 3,807,799 | 4/1974 | Freedman | 297/417 |
| 3,843,196 | 10/1974 | Burke | 297/417 |
| 4,159,148 | 6/1979 | Schulz | 297/417 |
| 4,205,879 | 6/1980 | Heling | 297/417 |

FOREIGN PATENT DOCUMENTS 63969  11/1982  European Pat. Off. ............ 297/417

Primary Examiner—William E. Lyddane
Assistant Examiner—Joseph Falk
Attorney, Agent, or Firm—Gifford, Van Ophem, Sheridan & Sprinkle

[57] ABSTRACT

An armrest is provided for a vehicle having a seat mounted to the floor of the vehicle and a transmission hump which protrudes upwardly from the floor adjacent the seat. The armrest comprises a base which straddles the transmission hump and is secured to the sides of the transmission hump by bolts or other fasteners. An elongated cushion is pivotally mounted at one end to the upper end of the base and is pivotal between a generally vertically extending position and a generally horizontally extending position.

7 Claims, 5 Drawing Figures

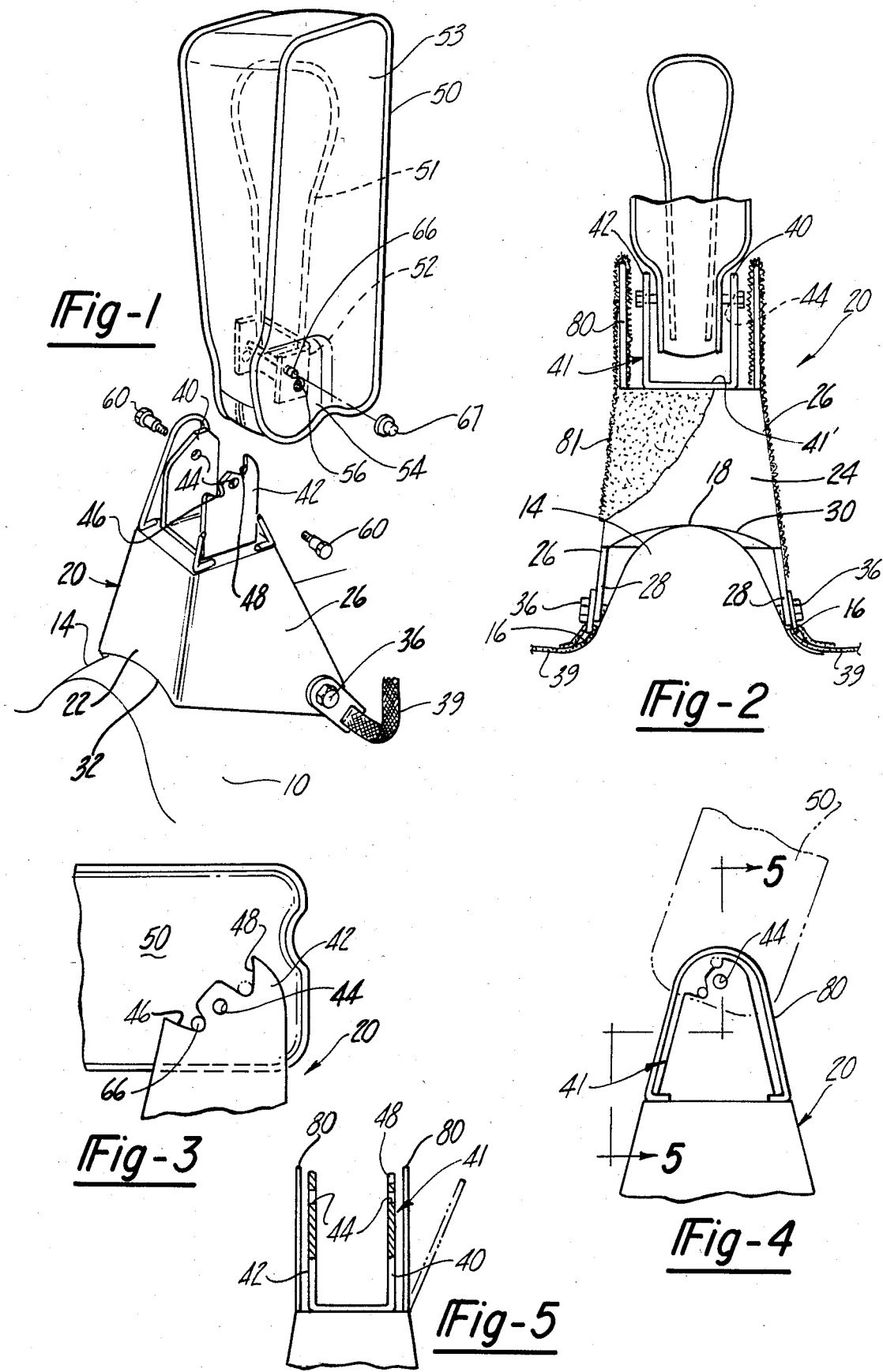

VEHICLE ARMREST

BACKGROUND OF THE INVENTION

I. Field of the Invention

The present invention relates to an armrest for an automotive vehicle.

II. Description of the Prior Art

In automotive vehicles having bucket seats, conventionally, the bucket seats are secured to the vehicle floor on opposite sides of the transmission hump. The transmission hump comprises an upwardly protruding portion of the vehicle floor which extends longitudinally along the vehicle floor between the driver and passenger seats. The vehicle hump provides clearance for the drive train of the vehicle in the well known fashion.

Typically, bucket seats do not include armrests. There have, however, been a number of previously known armrests which directly attach to the side of the bucket seat. A major disadvantage of these previously known armrests, however, is that the armrest must be specially constructed for each different type of bucket seats since bucket seats for different vehicle models are constructed differently.

SUMMARY OF THE PRESENT INVENTION

The present invention provides an armrest for a vehicle which overcomes the above-mentioned disadvantages of the previously known armrests.

In brief, the armrest of the present invention comprises a base having a top and a bottom and the bottom of the base is formed so that it straddles the transmission hump of the vehicle. The lower end of the base is then secured to the sides of the transmission hump by conventional means, such as bolts. Preferably, the bolts used to secure the vehicle seat belts are used to secure the base to the transmission hump.

An elongated cushion is pivotally mounted at one end to the upper end of the base so that the cushion is pivotal between an upper generally vertical extending position and a lower generally horizontally extending position. A stop pin is secured to the cushion to limit the pivotal position of the cushion between its upper and lower positions.

Since the base is directly secured to the transmission hump by the seat belt bolts already present in the vehicle, the armrest of the present invention can be readily and easily installed on virtually all automotive vehicles having a transmission hump and without regard to the type of bucket seat used within the vehicle.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a perspective exploded view illustrating a first preferred embodiment of the invention and with parts removed for clarity;

FIG. 2 is a rear view illustrating the first preferred embodiment of the invention;

FIG. 3 is a fragmentary side view of the first preferred embodiment of the invention;

FIG. 4 is a view similar to FIG. 3 but illustrating a second preferred embodiment; and FIG. 5 is a fragmentary sectional view taken substantially along line 5—5 in FIG. 4.

DETAILED DESCRIPTION OF PREFERRED EMBODIMENTS OF THE PRESENT INVENTION

With reference now to FIGS. 1 and 2, a first preferred embodiment of the armrest of the present invention is thereshown mounted to the floor 10 of a vehicle, such as a car. The vehicle floor 10 includes a transmission hump 14 which protrudes upwardly from the floor 10 and extends longitudinally along the vehicle in between the vehicle seats (not shown). In the conventional fashion, the transmission hump 14 includes a pair of laterally spaced sides 16 and a top 18 spaced upwardly from the floor 10. The top 18 and sides 16 of the transmission hump 14 are typically rounded or curvilinear.

The preferred embodiment of the armrest of the present invention comprises a base 20 having a front panel 22, a rear panel 24 (FIG. 2) and two side panels 26. Each side panel 26 includes a downwardly extending tail section 28 which extends downwardly from the bottom edge 30 (FIG. 2) of the rear panel 24.

The base 20 is in the shape of a truncated pyramid with a wider area bottom than top and the bottom of the base 20 is dimensioned to straddle the transmission hump 14 as best shown in FIG. 2. In doing so, the bottom edge 12 (FIG. 1) of the front panel 22 and bottom edge 30 of the rear panel 24 abut against the top 18 of the transmission hump 14 while the side panel tail sections 28 extend downwardly along the sides 16 of the transmission hump 14. The base 20 is then secured to the transmission hump by conventional fasteners 36, such as bolts, which extend through the tail sections 28 of the side panels 26 and into the sides 16 of the transmission hump 14. Preferably, the fasteners 36 are the same fasteners used to secure the seat belts 39 to the transmission hump 14 so that it is unnecessary to drill new holes in the hump 14.

With reference now to FIGS. 1, 2 and 3, the base 41' of a U-shaped bracket 41 forming a pair of spaced plates 40 and 42 is secured to the top of the base 20 so that the plates 40 and 42 are spaced apart and generally parallel to each other and lie in vertical planes substantially parallel to the longitudinal axis of the vehicle. A hole 44 is formed through each plate 40 and 42 and the holes 44 are aligned with each other. In addition, the second plate 42 includes a pair of notches 46 and 48 (FIGS. 1 and 3) on opposite sides of the hole 44 for a reason to be subsequently described.

With referece now particularly to FIG. 1, the armrest further comprises an elongated cushion 50 which is generally rectangular in cross sectional shape. Preferably, the cushion 50 includes a generally U-shaped rod 51 covered by a resilient material 53, such as rubber. A channel shaped bracket 52 is secured to the free ends of the rod 51 for a reason to be subsequently described.

The cushion 50 includes a recessed portion 54 on each side and at one end of the cushion 50. The recessed portions 54 are dimensioned so that they nest in between the plates 40 and 42.

A hole 56 formed through each recessed portion 54 of the cushion 50 so that the holes 56 are aligned with each other as well as as aligned with threaded holes in the channel shaped bracket 52 on the rod 51. The end of the cushion 50 is then pivotally mounted to the plates 40 and 42 by shoulder bolts 60 which extend through the plate holes 44, cushion holes 56 and threadably engage the threaded holes in the bracket 52.

With reference now to FIGS. 1, 3, and 4, a stop pin 66 covered by a cap 67 is secured to the bracket 52 so that the pin 66 extends outwardly from the cushion recessed portion 54 on the side of the cushion 50 adjacent the second plate 42. The stop pin 66 is radially offset from the cushion hole 56 so that when the cushion 50 is moved to a substantially horizontal position as shown in FIG. 3, the stop pin 66 enters the first notch 46 and limits the pivotal position of the cushion 50. Similarly, when the cushion 50 is raised to a vertical position, the stop pin 66 enters the second notch 48 and limits the pivotal position of the cushion 50 to a generally vertically extending position as shown in in FIG. 4.

As shown in FIG. 1, the pin 66 is mounted at one end in a hole formed in the side of the bracket 52 most spaced from the plate 42 and in a slot formed in the side of the bracket 52 closest to the plate 42. The slot enables the pin 66 to snap into the notches 46 or 48 and lock the cushion in position in its horizontal and vertical positions.

With reference to FIGS. 2, 4 and 5, a wire frame 80 is secured to the top of the base 20 on the outside of each plate 40 and 42. These frames 80 are covered by a fabric 81 (FIG. 2) which also covers the base 20 and the fabric 81 protects the passengers from injury or clothing damage from the plates 40 and/or 42 and their associated components. When access to the bolts 60 is desired, for example, to secure the cusion 50 to the base 20, the wire frames 80 can be simply bent outwardly as shown in phantom line in FIG. 5 and away from the plate 40 and 42.

From the foregoing, it can be seen that the present invention provides an armrest which is easily installed on the transmission hump 14 of the vehicle. Since the transmission humps for most vehicles are substantially the same size and shape, the armrest of the present invention can be easily installed on a wide range of different vehicles.

Having described my invention, however, many modifications thereto will become apparent to those skilled in the art to which it pertains without deviation from the spirit of the invention as defined by the scope of the appended claims.

I claim:

1. For use in conjunction with a vehicle having a seat mounted on a floor of the vehicle and said floor having a transmission hump which protrudes upwardly from the floor and has two sides, an armrest assembly comprising:
    a base having an upper end, a lower end, and two side panels, said side panels having tail sections which extend downwardly along the sides of the transmission hump,
    means for securing said tail sections of said base side panels to the transmission hump so that said upper end of said base is spaced upwardly from the transmission hump,
    an elongated cushion,
    means for pivotally mounting one end of said cushion to said upper end of said base;
    wherein said pivotal mounting means comprises a pair of spaced plates secured to the top end of said base, said one end of said cushion positioned in between said plates, and said pivotal mounting means extending between said plates and said cushion;
    means for limiting the pivotal position of said cushion in one direction so that a surface of said cushion lies in substantially a horizontal plane, said limitng means comprising a pin secured to said one end of said cushion and a notch formed in one of said plates, said pin nesting in said notch when said cushion is in said limited position; and
    wherein said limiting means and said pivotal mounting means together comprise the sole means for supporting said cushion so that said surface lies in said horizontal plane.

2. The invention as defined in claim 1 wherein said pivotal mounting means comprises a pair of shoulder bolts, one shoulder bolt being positioned through each plate and each shoulder bolt having a portion which engages said end of said cushion.

3. The invention as defined in claim 2 wherein said cushion comprises a U-shaped rod having a channel shaped bracket secured on its free ends and wherein each shoulder bolt threadably engages a threaded hole in said channel shaped bracket.

4. The invention as defined in claim 1 and comprises a pair of U-shaped wire frames, one wire frame secured to the top of the base on the outside of each plate, and a fabric cover for said wire frames.

5. The invention as defined in claim 1 wherein the vehicle includes seat belts and wherein said securing means comprises fasteners for securing both said base and the seat belts to the transmission hump.

6. For use in conjunction with a vehicle having a seat mounted on a floor of the vehicle and said floor having a transmission hump which protrudes upwardly from the floor and has two sides, an armrest assembly comprising:
    a base having an upper end, a lower end, and two side panels, said side panels having tail sections which extend downwardly along the sides of the transmission hump,
    means for securing said tail sections of said base side panels to the transmission hump so that said upper end of said base is spaced upwardly from the transmission hump,
    an elongated cushion,
    means for pivotally mounting one end of said cushion to said upper end of said base;
    wherein said pivotal mounting means comprises a pair of spaced plates secured to the top end of said base, said one end of said cushion positioned in between said plates, and said pivotal mounting means extending between said plates and said cushion;
    wherein said pivotal mounting means comprises a pair of shoulder bolts, one shoulder bolt being positioned through each plate and each shoulder bolt having a portion which engages said end of said cushion; and
    wherein said cushion comprises a U-shaped rod having a channel shaped bracket secured on its free ends and wherein each shoulder bolt threadably engages a threaded hole in said channel shaped bracket.

7. For use in conjunction with a vehicle having a seat and seat belts mounted on a floor of the vehicle and said floor having a transmission hump which protrudes upwardly from the floor and has two sides, an armrest assembly comprising:
    a base having an upper end, a lower end, and two side panels, said side panels having tail sections which extend downwardly along the sides of the transmission hump, means for securing said tail sections of said base side panels to the transmission hump so that said upper end of said base is spaced upwardly from the transmission hump, and wherein said securing means comprises fasteners for securing both said base and the seat belts to the transmission hump, an elongated cushion, means for pivotally mounting one end of said cushion to said upper end of said base;

wherein said pivotal mounting means comprises a pair of spaced plates secured to the top end of said base, said one end of said cushion positioned in between said plates, and said pivotal mounting means extending between said plates and said cushion.

* * * * *